(12) United States Patent
Murai et al.

(10) Patent No.: US 7,848,593 B2
(45) Date of Patent: Dec. 7, 2010

(54) METHOD OF PRODUCING AND DISPLAYING AN AERIAL PHOTOGRAPH DATA SET

(75) Inventors: Shunji Murai, Tokyo (JP); Yoichi Oyama, Hino (JP); Yoshihiko Minami, Fukuoka (JP); Yukio Akamatsu, Tokyo (JP); Hiroshi Takeda, Tokyo (JP)

(73) Assignee: Kokusai Kogyo Co., Ltd., Tokyo (JP)

( * ) Notice: Subject to any disclaimer, the term of this patent is extended or adjusted under 35 U.S.C. 154(b) by 1125 days.

(21) Appl. No.: 11/530,108

(22) Filed: Sep. 8, 2006

(65) Prior Publication Data

US 2008/0063299 A1 Mar. 13, 2008

(30) Foreign Application Priority Data

Aug. 8, 2006 (JP) .............................. 2006-238238

(51) Int. Cl.
*G06K 9/00* (2006.01)
(52) U.S. Cl. .................................................... 382/284
(58) Field of Classification Search ................ 382/103, 382/106, 284; 348/144, 147
See application file for complete search history.

(56) References Cited

U.S. PATENT DOCUMENTS

| | | | | |
|---|---|---|---|---|
| 4,984,279 | A | * | 1/1991 | Kidney et al. .................. 382/1 |
| 6,694,064 | B1 | * | 2/2004 | Benkelman .................. 382/284 |
| 7,339,614 | B2 | * | 3/2008 | Gruber et al. ............ 348/218.1 |

FOREIGN PATENT DOCUMENTS

| | | | | |
|---|---|---|---|---|
| JP | 2001-141452 | A | * | 5/2001 |
| JP | 2001-141454 | A | * | 5/2001 |
| JP | 2005-156514 | A | * | 6/2005 |

* cited by examiner

*Primary Examiner*—Andrew W Johns
(74) *Attorney, Agent, or Firm*—Lucas & Mercanti, LLP

(57) ABSTRACT

In the method of obtaining captures images, there is overlaps in images in the flight direction and in a direction (cross direction) that crosses the flight direction. A predetermined number of the captured images containing overlapping sections that include a target point are selected out of the obtained images in the flight direction and/or the cross direction. From the overlap sections of these captured images, selected images are obtained by selecting image sections within a specific range that contains the target point. Using the flight direction and the cross direction as axes for a matrix, the selected images are arranged to create an aerial photograph data set.

33 Claims, 9 Drawing Sheets

US 7,848,593 B2

METHOD OF PRODUCING AND DISPLAYING AN AERIAL PHOTOGRAPH DATA SET

CROSS REFERENCE TO RELATED APPLICATIONS

This Application claims the priority of Japanese Patent Application No. 2006-238238 filed Aug. 8, 2006, the contents of which are incorporated herein by reference.

BACKGROUND OF THE INVENTION

1. Technical Field

The present invention relates to an aerial photograph data set in which aerial photographs obtained by aerial photography is rearranged according to a specific system, a method for creating the same, and a method for displaying the same.

2. Background Technology

Conventionally, aerial photography is used for photogrammetry to perform topographical mapping, industrial surveying, surveying of cultural assets, natural disaster surveying, and the like. Aerial photography is generally performed with a certain endlap ratio and sidelap ratio so that captured images overlap both laterally and longitudinally. While this is done to avoid missing areas during imaging, in recent times there has also been an active use of overlapped areas in the captured images.

For example, in Japanese Laid-Open Patent Publication Number 2005-156514, there is an flight direction and a direction that crosses the flight direction that is perpendicular. Overlapping imaging is performed with the overlap ratio in both the flight direction and the cross direction perpendicular thereto set to about 60%. All overlapping images that contain a certain object image are selected, and the overlapping sections are arranged in the overlapping direction around an image in which the object image is positioned at the center, forming a matrix of 9 images. This creates an aerial photography image set.

While the conventional image set known in the patent publication and the like is very useful compared to prior image sets. However, because of problems such as a limited scope of applications and inadequate field of view and accuracy, there has been a need for photographic image data sets with further improvements.

For example, the patent publication and the like could only be used in limited applications because other sites besides the site directly below the principal imaging point, i.e., the imaging center, could not be used as a target point. Also, as to other conventional methods, the needs required for an aerial photograph data set would not be satisfied because of required significant time and huge expenses for aerial photographic imaging and image processing, by making the methods impractical. The visibility (ease of viewing) and handling was also inadequate.

Furthermore, with the conventional methods, when the imaging object is a structure such as a building, the tilt of the building is unstable or the side surfaces of the building or the like could not be adequately observed or the state of horizontally continuous land surfaces could not be observed, and the like.

Also, with the conventional methods, there are aerial photography Image data sets in which the overlapping imaging of a target is managed according to flight time intervals of the flight course, but there is no management of the direction (e.g., the perpendicular direction) intersecting with air flight direction (flight direction), making the data difficult to handle in practical use. There is also a need to make use of past data obtained with this type of conventional method as well. Alternatively, there are still imaging methods being used that involve irregular imaging positions. There is a need for aerial photography image data sets and a method for creating the same in these cases as well. Furthermore, if an aerial photograph data set is created after significant effort, there is still the need to have an improved displaying method. There is a need to a displaying method that is easy to see, easy to handle, that allows various measurements to be made easily, and the like.

SUMMARY OF THE INVENTION

The object of the present invention is to provide an improved photograph data set that meets various needs in the conventional technology and can be explained by the following representative Items. Item 1 provides a method for creating an aerial photograph data set wherein, out of a plurality of images obtained through aerial imaging, M×N captured images (where M and N are positive integers of no more than $1/(1-A)$ and $1/(1-B)$ respectively) that include a target point and that include an overlap section are selected in a flight direction and/or a cross direction, A being an endlap ratio in the flight direction of (where A=1 indicates complete overlap, and $0 \leq A<1$), and B being a sidelap ratio in the cross direction (where B=1 indicates complete overlap, and $0 \leq B<1$). Selected images are selected by selecting an image section in a specific range that includes the target point from the overlap section of each of these captured images. With the imaging direction serving as a first axis and the cross direction serving as a second axis, an image set is created as a matrix with M columns along the first axis and N rows along the second axis, with captured images being arranged in imaging sequence along the first axis and the image sections being arranged in imaging sequence to be in the cross direction with the imaging position of the first axis.

Furthermore, Item 2 of the present invention provides a method for creating an aerial photograph data set according to Item 1 in which the image sections are obtained so that the spatial position of the target point is put at the center of the image section through back projection that provides correction for orientation parameters. Item 3 provides a method for creating an aerial photograph data set according to Item 1 or Item 2 wherein, using a virtual spatial position in which the spatial position is moved by a predetermined distance as a new target point, the method for creating the aerial photography image data set is repeated. Furthermore, this move is performed in the imaging direction and in the cross direction, for which the method is repeated, creating a plurality of aerial photograph data sets.

Item 4 provides a method for creating an aerial photography data set according to Item 1 or Item 2 wherein the aerial photograph data set is used as a first set. The target point is shifted by a predetermined distance to serve as a new target point. The creation of an aerial photograph data set is repeated for the new target point to obtain a new aerial photograph data set. This shifting is repeated in both the forward direction and the reverse direction of the imaging direction and in both the forward direction and the reverse direction of the cross direction to provide new target points. This is repeated P times on one side of the imaging direction and Q times on one side of the cross direction (where P and Q are positive integers), and aerial photography image data sets are created for the $((2P+1)\times(2Q+1)-1)$ new target points. One specific image is selected from each of the $(2P+1)\times(2Q+1)$ (including the first set) aerial photograph data sets. The selected image from the first set is placed at the center. The images selected from the P and Q shifted aerial photograph data sets are arranged in positions corresponding to their respective shifts.

Item 5 provides a method for creating an aerial photograph data set according to Item 4 wherein the specific images are selected from the same row and same column from the aerial photography image data sets. Item 6 provides a method for creating an aerial photograph data set according to Item 4 or Item 5 wherein P=Q=1. Item 7 provides a method for creating an aerial photograph data set according to any one of Item 1 through Item 6 wherein the spatial position of the target point is specified.

Item 8 provides a method for creating an aerial photograph data set according to Item 1 or Item 2 wherein L×L (where L is an integer that is no more than the smaller of M and N) adjacent selected images are selected from the image set. A specific image set is created by arranging the selected images in an L×L matrix in the arrangement of the image set.

Furthermore, Item 9 provides a method for creating an aerial photograph data set according to any one of Item 1 through Item 8 wherein A=B and M=N. Item 10 provides a method for creating an aerial photography image data set according to Item 9 wherein A=B=0.8 or approximately 0.8, and M=N=5. Item 11 provides a method for creating an aerial photography image data set according to any one of Item 1 through Item 10 wherein the selected image is rectangular. Item 12 provides a method for creating an aerial photograph data set according to Item 11 wherein the aspect ratio of the rectangle is 2:1 or roughly 2:1.

The present invention according to Item 13 provides an aerial photograph data set wherein, out of a plurality of images obtained through aerial imaging, M×N captured images (where M and N are positive integers of no more than $1/(1-A)$ and $1/(1-B)$ respectively) that include a target point and that Include an overlap section are selected in the imaging direction and/or the cross direction, A being an endlap ratio in the direction of aerial imaging (where A=1 indicates complete overlap, and $0 \leq A < 1$), and B being a sidelap ratio in a direction crossing the imaging direction (where B=1 indicates complete overlap, and $0 \leq B < 1$). Selected images are selected by selecting an image section in a specific range that includes the target point from the overlap section of each of these captured images. With the imaging direction serving as a first axis and the cross direction serving as a second axis, an image set is created as a matrix with M columns along the first axis and N rows along the second axis, with captured images being arranged in imaging sequence along the first axis and the image sections being arranged in imaging sequence to be in the cross direction with the imaging position of the first axis.

Furthermore, Item 14 of the present invention provides an aerial photograph data set according to Item 13 in which the image sections are obtained so that the spatial position of the target point is put at the center of the image section through back projection that provides correction for orientation parameters. Item 15 provides an aerial photograph data set according to Item 13 or Item 14 wherein, using a virtual spatial position in which the spatial position is moved by a fixed distance as a new target point, the method for creating the aerial photograph data set is repeated. Furthermore, this moving is performed in the imaging direction and in the cross direction, for which the method is repeated, creating a plurality of aerial photograph data sets.

Item 16 provides an aerial photograph data set according to Item 13 or Item 14 wherein the aerial photograph data set is used as a first set. The target point is shifted by a fixed distance to serve as a new target point. The creation of an aerial photograph data set is repeated for the new target point to obtain a new aerial photograph data set. This shifting is repeated in both the forward direction and the reverse direction of the imaging direction and in both the forward direction and the reverse direction of the cross direction to provide new target points. This is repeated P times on one side of the imaging direction and Q times on one side of the cross direction (where P and Q are positive integers), and aerial photograph data sets are created for the $((2P+1)\times(2Q+1)-1)$ new target points. One specific image is selected from each of the $(2P+1)\times(2Q+1)$ (including the first set) aerial photography image data sets. The selected image from the first set is placed at the center. The images selected from the P and Q shifted aerial photograph data sets are arranged in positions corresponding to their respective shifts.

Item 17 provides an aerial photograph data set according to Item 16 wherein the specific images are selected from the same row and same column from the aerial photograph data sets. Item 18 provides an aerial photograph data set according to Item 16 or Item 17 wherein P=Q=1. Item 19 provides an aerial photograph data set according to Item 16 or Item 17 wherein the spatial position of the target point is specified. Item 19 provides an aerial photograph data set according to Item 13 or Item 14 wherein L×L (where L is an integer that is no more than the smaller of M and N) adjacent selected images are selected from the image set. A specific image set is created by arranging the selected images in an L×L matrix in the arrangement of the image set. Item 20 provides an aerial photograph data set according to any one of Item 13 through Item 19 wherein A=B and M=N.

Item 21 provides an aerial photograph data set according to Item 20 wherein A=B=0.8 or ≅0.8, and M=N=5. Item 22 provides an aerial photograph data set according to any one of Item 13 through Item 21 wherein the selected image is rectangular. Item 23 provides an aerial photograph data set according to Item 22 wherein the aspect ratio of the rectangle is 2:1 or roughly 2:1.

In addition to a method for creating an aerial photograph data set and an aerial photograph data set obtained with this method, the present invention also provides a method for displaying the aerial photograph data set. Item 24 provides a method for displaying an aerial photograph data set wherein, out of a plurality of images obtained through aerial imaging, M×N captured images (where M and N are positive integers of no more than $1/(1-A)$ and $1/(1-B)$ respectively) that include a target point and that include an overlap section are selected in the flight direction and/or the cross direction, A being an endlap ratio in the flight direction of (where A=1 indicates complete overlap, and $0 \leq A < 1$), and B being a sidelap ratio in the cross direction (where B=1 indicates complete overlap, and $0 \leq B < 1$). Selected Images are selected by selecting an image section in a specific range that includes the target point from the overlap section of each of these captured images. With the flight direction serving as a first axis and the cross direction serving as a second axis, an image set is created as a matrix with M columns along the first axis and N rows along the second axis, with captured images being arranged in imaging sequence along the first axis and the image sections being arranged in imaging sequence to be in the cross direction with the imaging position of the first axis. From this aerial photograph data set, a desired number of vertical and horizontal images are selected and displayed in the matrix form. Furthermore, Item 25 provides a method for displaying an aerial photograph data set according to item 24 in which the image sections are obtained so that the spatial position of the target point is put at the center of the image section through back projection that provides correction for orientation parameters.

Item 26 provides a method for displaying an aerial photograph data set according to Item 24 or Item 25 wherein the aerial photograph data set is used as a first set. The target point is shifted by a fixed distance to serve as a new target point. The creation of an aerial photograph data set is repeated for the new target point to obtain a new aerial photograph data set. This shifting is repeated in both the forward direction and the reverse direction of the imaging direction and in both the forward direction and the reverse direction of the cross direction to provide new target points. This is repeated P times on one side of the flight direction and Q times on one side of the cross direction (where P and Q are positive integers), and aerial photograph data sets are created for the ((2P+1)×(2Q+1)−1) new target points. One specific Image is selected from each of the (2P+1)×(2Q+1) (including the first set) aerial photograph data sets. The selected image from the first set is placed at the center. The images selected from the P and Q shifted aerial photograph data sets are arranged in positions corresponding to their respective shifts.

Item 27 provides a method for displaying an aerial photograph data set according to Item 26 wherein the specific images are selected from the same row and same column from the aerial photography image data sets. Item 28 provides a method for displaying an aerial photograph data set according to Item 26 or Item 27 wherein P=Q=1.

Item 29 provides a method for displaying an aerial photograph data set according to Item 24 or Item 25 wherein L×L (where L is an integer that is no more than the smaller of M and N) adjacent selected images are selected from the image set. A specific image set is created by arranging the selected images in an L×L matrix in the arrangement of the image set. Item 30 provides a method for displaying an aerial photograph data set according to any one of Item 24 through Item 29 wherein A=B and M=N. Item 31 provides a method for displaying an aerial photograph data set according to Item 30 wherein A=B=0.8 or ≅0.8, and M=N=5.

Item 32 provides a method for displaying an aerial photograph data set according to any one of Item 24 through Item 31 wherein the selected image is rectangular. Item 33 provides a method for displaying an aerial photograph data set according to Item 32 wherein the aspect ratio of the rectangle is 2:1 or roughly 2:1.

With the present invention as described above, the disadvantages of the conventional method described above can be improved and a preferable aerial photograph data set, a method for creating the same, and a display method can be provided. For example, while the patent publication improves the prior method and is preferable, compared to the advantages described in the patent publication, the present invention allows the target point to be selected freely, allows an object not at the imaging center to be selected, and allows the height of the object to be targeted to be selected. Thus, any point can be a target point.

Furthermore, images of various orientations can be set up for an arbitrary target point. In the case of a building, for example, an aerial photograph data set with the building leaning in the same direction can be created easily. Compared to the patent publication, for example, this provides far superior ease of use, ease of handling, and accuracy in surveying. Also, data sets can be easily created from past data, making it possible to obtain aerial photograph data sets that are easy to handle at low cost.

Also, even if the imaging plan is irregular (e.g., there are irregularities in the endlap ratio and/or the sidelap ratio of the captured images), an intended aerial photograph data set can be obtained.

Furthermore, when the aerial photograph data set from the different aspects of the present invention are used for displaying, occluded sections of the target point that could not be seen due to shadows from surrounding objects can be seen. This eliminates the disadvantage of the conventional methods, where sections could not be seen because of occlusion. This makes it possible provide a superior display for surveying, education, and the like, and makes it possible to provide a display that meets the needs of the user.

These are some representative advantages of the present invention. The present invention dramatically expands the range of applications for aerial photographic images. Other advantages will be made clear from the following description.

BRIEF DESCRIPTION OF DRAWINGS

FIG. 13 illustrates a new aerial photograph data set selected from corresponding rows and columns from FIG. 11, FIG. 12, and the like;

DETAILED DESCRIPTION OF THE INVENTION

Figure 1:
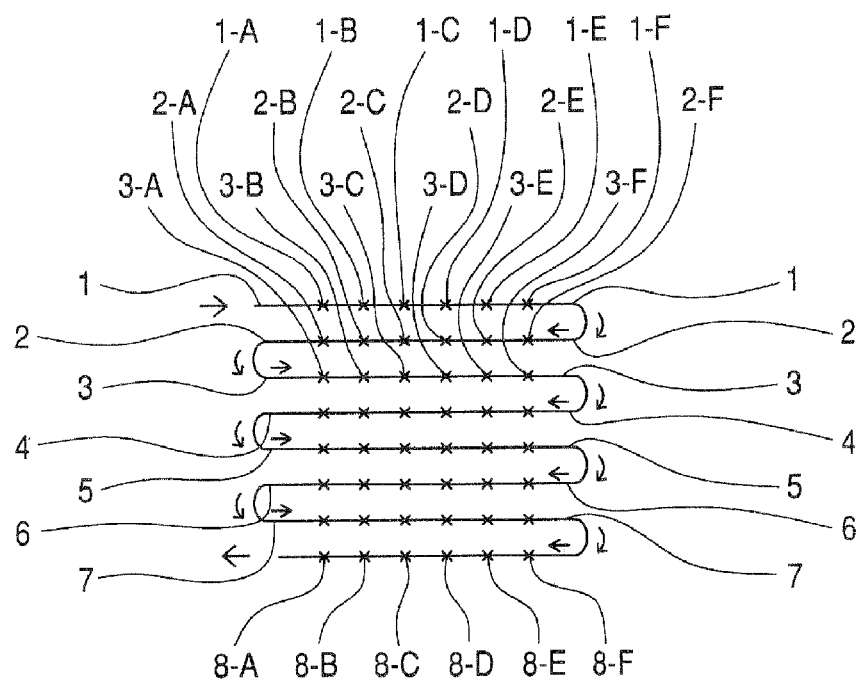
FIG. 1 illustrates the flight path of an aircraft and imaging sites according to an example of the present invention.

In the present invention, an endlap ratio is the overlap ratio of the overlap of captured images in the direction of the aircraft flight direction when aerial photography is performed from the aircraft at a fixed altitude, i.e., the ratio at which captured images overlap in the imaging direction. In general, imaging is performed with approximately ⅔ (approximately 67 percent, A≅0.67) overlap in the captured images (see the patent publication) or at approximately ⅘ (approximately 80 percent, A≅0.8). When the aircraft completes the imaging of a single flight route, it generally makes a U-turn and takes a flight route in the opposite direction that is parallel to and at an identical altitude with the previous flight route. Aerial imaging is then performed in the reverse direction using the endlap ratio described above. A sidelap ratio is the ratio of overlap with captured images from adjacent flight routes. Aerial imaging can be repeated multiple times to increase the endlap ratio. The imaging position in the flight direction can be moved to increase the endlap ratio, the flight route can be shifted toward an adjacent flight route to increase the sidelap ratio, or both can be combined to increase the endlap ratio as well as the sidelap ratio.

In the present invention, the endlap ratio and the sidelap ratio are ratios set up according to the intention or the plan for imaging. In practice, however, the intention or plan may not be followed, and for unavoidable reasons during imaging, these ratios may vary rather than stay fixed during imaging. The use of the terms endlap ratio and sidelap ratio in the present invention encompass these meanings as well. However, in many cases, the aircraft flies along a predetermined route based on a flight plan and aerial imaging plan with a predetermined endlap ratio and sidelap ratio, and aerial imaging is performed according to the imaging plan. The overlap ratios planned in the imaging plan are determined based on factors such as imaging course management method, the performance or size of the imaging element, e.g., CCD, in the imaging device, and the shape of the imaging element (e.g., the aspect ratio if a four-sided shape is used).

With advances in measurement devices such as GPS devices in recent years, more precise measurement of aerial imaging positions, including altitude, can be provided. By recording or storing aerial imaging position information each time imaging is performed, it is possible to record or store the imaging position and altitude of each aerial captured image precisely. In the present invention, the imaging state of each captured image can be determined after imaging from the aerial imaging position described above even if imaging was not performed according to the imaging plan for some reason.

Thus, even if the imaging altitude varies with each imaging operation, the aerial imaging position information can be used to correct the captured images so that they appear to be captured at the same altitude. If the planned endlap ratio and sidelap ratio according to the present invention varies significantly from the actual ratios during imaging, the actual variations can be used so that M and N values are determined from the endlap ratio and the sidelap ratio of the present invention. In this case, if correction is applied as described above, the overlap ratios can be used for the corrected captured images.

In the present invention, it would be preferable for the endlap ratio and the sidelap ratio to both have a fixed value, but the present invention is not restricted to this. If there are variations during aerial imaging, it is often preferable to select the lowest possible values from the entire imaging range. Alternatively, it is often preferable to select the lowest possible ratios from a range that contains a target point. It would be preferable for the endlap ratio and the sidelap ratio to be greater than 50 percent. In generally, high ratios are preferable. It would be preferable for the ratios to be at least approximately 60 percent and more preferably at least approximately 80 percent. In this case, the A and B described above would be these values. More specifically, it would be preferable for A and B to both be at least approximately 0.6 and more preferable for A and B to both be at least approximately 0.8. For example if the aspect ratio is 2:1 and A is approximately 0.8 and B is approximately 0.9, the distances between laterally and longitudinally adjacent imaging positions become identical or roughly identical, making information easier to handle.

However, when past aerial captured image data is used to prepare an aerial photograph data set according to the present invention or the like and the actual ratios vary significantly from the plan, it would be preferable to select, as ratios to determine the M and N values, the smallest ratios overall or at least within a range that includes the target point. Also, if there are extremely low ratios, it would be possible to successively eliminate these extremely low ratios, starting from the lowest. Then, the M and N values can be determined using the lowest remaining captured image overlap ratios within the acceptable ranges for the M and N values and within a range that contains the target point described above.

In the present invention, the aerial imaging direction is the flight direction of the aircraft, but in some cases the flight course may vary from the planned flight course due to factors such as the influence of winds during flight. This type of variation is one reason for the variations in overlap ratios. Also, the cross direction described above is a direction that crosses the imaging direction and it is usually preferable that it is perpendicular. However, the imaging direction is often not stable in practice, so the use of the perpendicular direction is not crucial. Furthermore, an east-west flight course is generally used, but in some cases south-north directions and diagonal directions may be used. Since in some cases the cross direction may not be strictly perpendicular, the "perpendicular direction" referred to hear covers roughly perpendicular directions as well, and the cross direction includes cases where the imaging direction is in the east-west direction, the south-north direction, or a diagonal direction.

In the present invention, it would be preferable for the imaging device used for aerial imaging to be a digital aerial camera, and it would be preferable to use one with a high pixel count due to accuracy, image density, and the like. However, the selection of a suitable digital aerial camera can be based on the pixel count and performance suited for how the obtained captured images will be used and the like. An analog aerial camera can be used, but the captured images will be converted after imaging from analog to digital images.

Also, camera systems that capture static images, e.g., still cameras, are generally used, it would be possible to use camera systems that capture video, e.g., a movie camera. Regarding the imaging timing at which images are to be captured, images are generally captured at a predetermined time interval as In video systems. When the aircraft is flying at a fixed speed and a fixed altitude and a fixed direction, the overlap ratios will stay constant. However, in a natural environment, there may be variations. Thus, taking into account the corrections to be applied later, it is important to use a measuring instrument such as a GPS to record or store, at each image capture, the capture position, the altitude, and the flight direction (generally the orientation of the imaging device, e.g., the rotation angle relative to the horizontal axis, the rotation angle relative to the perpendicular axis, and the rotation angle within the imaging plane).

Alternatively, the imaging timing can be synchronized with a measuring instrument such as a GPS so that images are captured at measured positions at fixed distance intervals. In such cases also, the altitude may not be fixed, so it is also necessary to record or store aerial imaging position information and the like.

In the present invention, a target point is a point of interest in a captured image. It does not have to be a particular object that was the target when the image was captured. It can be selected from the objects and the like in the captured image. For example, a building or the like that was not of interest during imaging may need to be studied carefully. This building or the like can be selected as a point of interest. Furthermore, in some cases, there may be interest in the building or the like at a certain altitude (e.g., at a certain floor). In this case, the target point would be a specific altitude of the building or the like. The target point is a point identified by the altitude and position of the center of the selected object. In other words, the point identified by the altitude and position of the object of interest is the target point. The ability to arbitrarily select a target point is one of the characteristics of the present invention.

As described above, among the images captured according to a flight plan and imaging plan, the captured images containing the imaging object that was the initial imaging object are generally at the center. If a captured image containing a target point located at a position that is a certain distance away from the imaging object described above, and the captured image region is corrected using the capture position information and the capture altitude information and the like, the relationship between the corrected image region and the position of the target point would be used. When the spatial position (position and altitude) of the target point are identified and entered, it is possible to select a captured image containing the target point automatically (automatic selection) based on the entered target point position and altitude.

For this automatic selection, well-known image processing software can be used with minor modifications. For example, by comparing the boundary position information of the corrected image regions and the entered position and altitude information for the target point, it is possible to include a step for selecting the regions that contain the target point in the boundary positions (e.g., by determining whether the point is within boundary positions by checking whether it is between the upper and lower and left and right boundary positions). If a necessary number of captured images containing the target point is not available, it would be preferable to warn the user by indicating this on the display of the image processing device.

The overlap ratios are associated with the maximum number of captured images that can be automatically selected. This number will be higher when the overlap ratios are higher. For example, if the endlap ratio and the sidelap ratio are both approximately 67%, three images can be selected in the imaging direction and three images can be selected in the perpendicular direction. Thus, the maximum number of automatically selected captured images will generally be 3×3=9 images. Similarly, if the endlap ratio and the sidelap ratio are both approximately 80%, the maximum number of automatically selected images will generally be 25 images. Also, if the endlap ratio is approximately 80% and the sidelap ratio is approximately 67%, the maximum number of automatically selected images will generally be 15 images.

Thus, the maximum values of M and N described above will be positive integers of no more than $1/(1-A)$ and $1/(1-B)$ respectively (where A and B are the endlap ratio and the sidelap ratio respectively). In the present invention, the maximum values can be used for M and N, but values less than the maximum values can be selected according to the application. For example, if $A \neq B$, it would be possible to select the lower value of the endlap ratio and the sidelap ratio (the L described above) so that the selected captured images can be arranged in a square matrix (L×L) with M=N.

As described above, the selection can also be performed automatically when $A \neq B$ and M=N. In this case, the software should automatically perform selection so that, when a captured image best suited for the usage purpose is indicated out of the automatically selected images, the selected captured images can be arranged in a matrix so that they are adjacent to each other and so that they are adjacent in a way that they have the highest overlap ratio along both the rows and columns. The position information for the captured image regions and the position information for the target point would be used in this case as well.

Thus, according to the present invention, the ultimately selected captured images are laid out or arranged so that, as described above, when they are laid out in a matrix, they are adjacent to each other and so that they have the highest overlap ratio along both the rows and columns. More specifically, in the present invention, the imaging sequence is different for each row, with adjacent rows in the imaging direction being imaged in opposite directions to each other. Thus, if the first row was, for example, imaged from left to right, then the next row was imaged from right to left. After the images have been arranged, the arrangement is in the imaging sequence arrangement according to the present invention.

The values of M and N are constants or variables. If the data or the display arrangement is in the form of a square matrix, a rectangular matrix, or a rhomboid matrix, or the like, they will be constant for the rows and columns. However, if the arrangement is a trapezoidal matrix, the number of columns may vary from row to row. In a matrix formed in the shape of two trapezoids sharing a base, the first row and the last row may have the same, smallest N value, while the center row has the largest N value (generally with rows that alternate between odd and even numbers).

In the present invention, the specific range described above is defined smaller than the imaging region since the aerial imaging will generally capture images with the imaging object at the center. This defined range is related to the overlap ratios described above as well as the distance from the imaging center to the target point. For example, if the overlap ratios are high, at approximately 80% or more, and the target point is a short distance from the imaging center, the specific range will be defined within a region that is roughly similar to the imaging region. If the overlap ratios are low and the distance from the position of the target point to the center of the imaging region is large, the specific range will be defined small.

In either case, the selected images will be selected freely from the regions in the defined range (defined range region), but if the defined range region varies due to the different captured images, the smallest defined range region overall is generally used as the specific region, and the selected images are selected within this specific range. It would be preferable for the specific range to be the maximum range of the defined range region, with the selected images being images in the range defined by the specific range. If for all the selected captured images, two adjacent captured images are compared to identify the defined range region, and this is repeated, automatically selecting the smallest defined range region will provide the largest defined range region, so this can generally be used as the defined range region, with the images within the range serving as the selected images. However, there are cases where the user may not need the selected image to be the entire image at the edges of the rows and columns, so in such cases the defined region does not have to be the smallest defined range region.

If it is obvious that the selected image is adequately within the defined range region and this is input ahead of time, the selection of captured images can be selected as described above with the indicated selected image region. This reduces processing time since it can be achieved without performing the selections for all the captured images as described above, and this is a preferred example of the present invention.

If the input for the selected image is obviously outside the defined range region, this can be indicated on the display of the image processing device and a change in the input can be requested. If it is not obvious whether the selected image input is inside or outside the defined range region, then it would be preferable for the overlap ratios of the captured images to be determined. Then, the image within the defined range can be shown on the display with the determined overlap ratios so that the selected image can be indicated.

For the imaging range, imaging devices with 2:1 aspect ratios are preferable because they are easy to obtain and have a high pixel count. The imaging range of the imaging device is not restricted to having an aspect ratio of 2:1. Devices with 1:1 aspect ratios and other aspect ratios are also known and these can be used as well. It would be preferable for the imaging device to have a high pixel count.

It would be possible to use the aerial photography image data set obtained according to Item 1 and/or Item 2 as the initial set. A new data set can then be obtained by taking this data set and shifting the target point by a fixed distance, with this shifting operations being repeated in the imaging direction and the cross direction. Also, the method for crating the aerial photography image data set can be repeated to create multiple aerial photography image data sets. For example, this can be repeated P times in the imaging direction and Q times in the cross direction to create aerial photography image data sets for ((2P+1)×(2Q+1)−1) new target points.

Next, for each of the obtained (2P+1)×(2Q+1) aerial photography Image data sets, the image at the same row and column (e.g., row 3, column 2) can be selected. The selection from the initial set is placed in the center, and the associated images selected from the P and Q shifted aerial photography image data sets can be laid out or arranged in corresponding positions.

When the aerial photograph data set obtained in this manner is arranged in a (2P+1)×(2Q+1) arrangement and shown on a display, e.g., when P=Q=1, a 3×3 aerial photograph data set is created and displayed, a series of appearances of the initial target point oriented in the same direction as seen from different imaging positions can be obtained. This makes it easy to understand the appearance of the target point, and allows observations for surveying, monitoring, and the like that were not possible with conventional methods.

For this reason also, it would be preferable for the target point to be positioned at the center of the images in the aerial photograph data set. Thus, when determining the specific region, it would be preferable to have the steps performed with the target point at the center.

In the present invention, a method known as back projection is used for the correction to make the imaging appear to have been done from a single altitude, the correction of image regions, the correction of position information, and the like. In this method, captured images or the like are corrected using position information (the X axis and Y axis coordinates of the position) and altitude (the Z axis coordinate of the position) contained in the position information during imaging and the angles along three axes relating to the tilt of the imaging device during imaging (the rotation angle K around an axis perpendicular to the horizontal plane, the rotation angle ω around the X axis of the position, and the rotation angle φ around the Y axis of the position). For example, this method is described in detail in FIG. 2 of the patent publication.

For example, looking at a target point, the spatial position of the target point (the X axis value, the Y axis value, and the Z axis value) obtained through actual measurement is used to perform back projection to the center of the optical system of the imaging device performing the imaging. An orientation image plane of the captured image is imagined, and correction values (X axis value, Y axis value, ω value, φ value, κ value) for the orientation parameters are introduced, and an orientation image plane corrected for these orientation parameters is imagined. The corrected target point is determined in this corrected orientation image plane. The back projection in the present invention includes this aspect, of course. Also, since similar advantages can be obtained by arbitrarily positioning a projection plane and projecting a projection image corrected for these orientation parameters while projecting the captured image onto the projection plane, the present invention includes this aspect as well.

In the present invention, a matrix arrangement is a matrix-shaped arrangement, as described above with reference to the M and N values. Images are laid out or saved or displayed in a matrix arrangement that is generally a matrix with a clean arrangement with rows and columns intersecting perpendicularly, but arrangements where the rows and columns intersect obliquely are also included. In other words, matrices in which the first axis and the second axis described above intersect at right angles are covered, and matrices such as rhomboid matrices in which the rows and columns intersect obliquely are also covered. Furthermore, matrices shaped like trapezoids sharing a base are also covered.

Generally, imaging is performed with a flight direction going alternately north and south while moving east-west. Thus, the imaging direction is north-south (including both directions), and it would be preferable for the rows of the aerial photograph data set to be the north-south direction. Also, it would be preferable for the columns to be the east-west direction, resulting in a east-west, north-south matrix.

However, the Flight direction may involve alternately going north and south and moving from west to east. The flight plan will be planned according to the objective and taking into account different factors. For the display method it would be preferable to use an east-west, north-south matrix as described above. However, depending on the flight plan, it may be preferable to use, e.g., a matrix where the columns are north-south and the rows are east-west. Also, depending on how the data is to be ultimately displayed, it could be preferable instead of using a vertical/horizontal matrix to use a staggered matrix (e.g., in the shape of two trapezoids sharing a base), depending on the objective.

In particular, when the aerial photography image data set of the present invention is to be created from conventional, saved data, e.g., old analog-format data, the overlapping between rows and columns may not necessarily be suitable, and laying out the data to provide suitable overlap may result In a vertical/horizontal matrix not being suitable. Also, there may be cases where it would be preferable for the perpendicular direction described above to be an oblique direction rather than perpendicular. Also, the aerial photograph data set to be saved and the matrix arrangement to be displayed may be different, and it may be preferable for them to be different. It would be preferable for the display to be set up with a matrix that is the most visually interesting or the most easily identifiable.

Also, the matrix shape can be square, rectangular, rhomboid, trapezoidal, or the like according to the objective. Thus, the values of M and N are selected according to the objective, but in standard cases, e.g., A and B are equal or roughly equal and standard conventional overlap ratios of 0.67 or 0.8 are used, a square matrix with M=N=3 or M=N=5 can generally be used. However, in the latter case, a rectangular matrix with M=5, N=3 selected can also be used.

The aerial photograph data set described above and/or the method for creating the aerial photograph data set described above can be repeated for new target points, and the multiple aerial photograph data set obtained using the method for creating multiple aerial photograph data set is stored in a storage device. The data sets can be shown on the display on demand, or it can be shown using the saved data in response to an instruction from a remote display by way of communication means such as optical communication.

When the spatial position of a target point is entered to this display device, a search is made of the aerial photograph data sets stored in the storage device, and the data set is displayed using a suitable display method. Of course, if the desired aerial photograph data set does not exist, the image processing device connected to the storage device is operated and the method described above is used to create the necessary aerial photograph data set from the original captured images and send it to the display device. The aerial photograph data set that was sent can also be saved in the storage device.

In the display method described above, it would be preferable to display the data in a matrix with perpendicular axes. However, it would also be possible, depending on the objective, to select a display in which the rows and columns intersect obliquely or the rows and columns are displayed separated by spaces or the like.

For example, for surveying or for plotting, it would be preferable to provide a display arrangement that duplicates or approximates the positional relationships during imaging so that accurate positioning can be seen. Generally, a display with perpendicular axes is used. On the other hand, it would also be possible to have a more unique design if the user wants to see a target point on a map or a three-dimensional map out of curiosity.

Below will be presented, with references to the figures, a more detailed description of the present invention, along with specific examples.

FIG. 1 is a simplified drawing illustrating how an aircraft flies to perform imaging according to a first example. To facilitate the description, the figure will be referenced as if it were rotated 90 deg to the right. The aircraft flies in the order of 1-8, starting from south to north, turning back, moving west a certain distance, and then flying from north to south. This is then repeated. The odd numbers indicate flight routes from south to north and the even numbers indicate the reverse. The numbers 1-8 indicate the rows.

The imaging positions are positions 1-A through 8-A, with position 1-A being the first imaging position and position 8-A being the last imaging position. The designators between these are omitted. Thus, the columns are indicated as A through F. In the case of the example in FIG. 1, the imaging direction and the cross direction are perpendicular, and the rows and columns are perpendicular. The endlap ratio and the sidelap ratio during imaging are both the same, at 0.8, according to the plan. If the flight environment is good and the flight was stable, with a fixed altitude and a flight path according to plan with no tilting of the aircraft, captured images as shown in FIG. 2 (in this example, the aspect ratio is 2:1) can be obtained.

Figure 2:
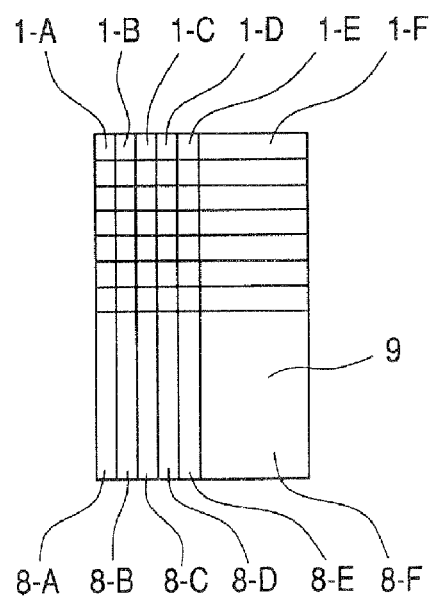
FIG. 2 illustrates overlapping sections of images captured at the imaging sites are arranged in an overlapping manner.

FIG. 2 is a simplified drawing illustrating the captured images from FIG. 1. The figure shows a total of 48 captured images 9. The 48 captured images are overlapped so that the overlapping sections are aligned on the captured images. The figure shows the captured images corresponding to the 48 imaging positions from the position 1-A to the position 8-A (as in FIG. 1, intermediate numbers are omitted).

Figure 3:
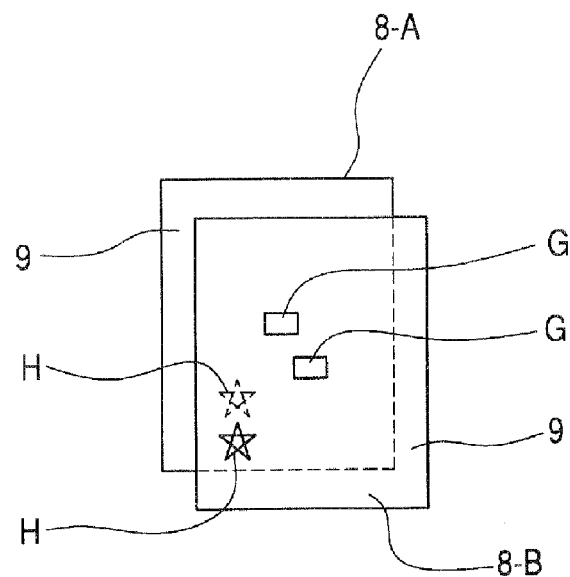
FIG. 3 illustrates the relationship between an imaging object and a target point in an image selected from the captured images in FIG. 2.

In FIG. 3, two captured images 9 from the imaging positions 8-A and 8-B were selected out of the 48 captured images 9 and are shown with the image for the position 8-B shifted downward. The figure shows a target point H. Corresponding to this shift, there is a shift between the position on the captured image for 8-A and the captured image for 8-B. If the captured image 9 for 8-B is not shifted downward, the position would overlap at the same position as the one on 8-A. This target point is shown on the captured images via back projection.

Figure 4:
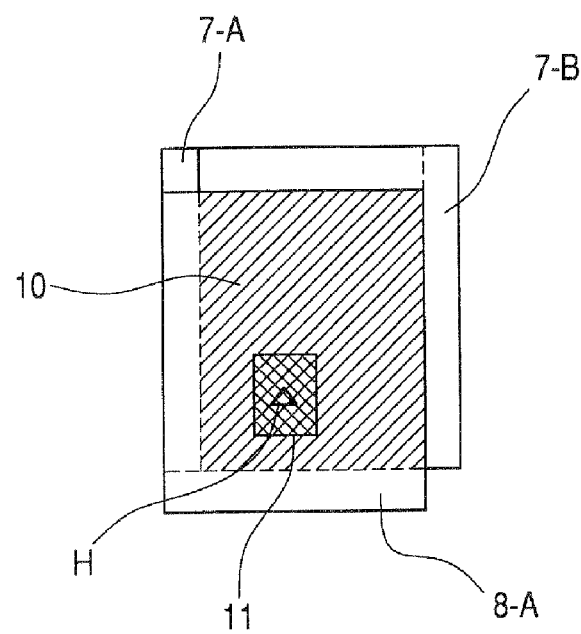
FIG. 4 illustrates the selected image from FIG. 3.

FIG. 4 is a simplified drawing that accurately shows how the captured images from FIG. 2 overlap. The overlapping make the images confusing, so FIG. 3 may be referred to as well. In order to illustrate three captured images (the captured images for the imaging positions 7-A, 7-B, and 8-A), in FIG. 4, overlap sections 10 are aligned and the images are overlaid, starting from the bottom, in the sequence in which they were captured. The figure also shows the target point H. (As in the description above, the target point H is projected onto the captured images.)

Within the shaded region of the overlap section 10, a specific range, indicated by dark shading, is set up so that the target point which is positioned away from the captured image will be in the center of region. This region serves as a selected image 11. In the case of FIG. 4, it would be preferable for M=N=3 and L=3 due to the relationship between the target point position and the captured images. Thus, out of the 48 total captured images, the 9 images of 6-A, 6-B, 6-C, 7-A, 7-B, 7-C, 8-A, 8-B, and 8-C are selected, and from these captured images, the selected image 11 is selected.

Figure 5:
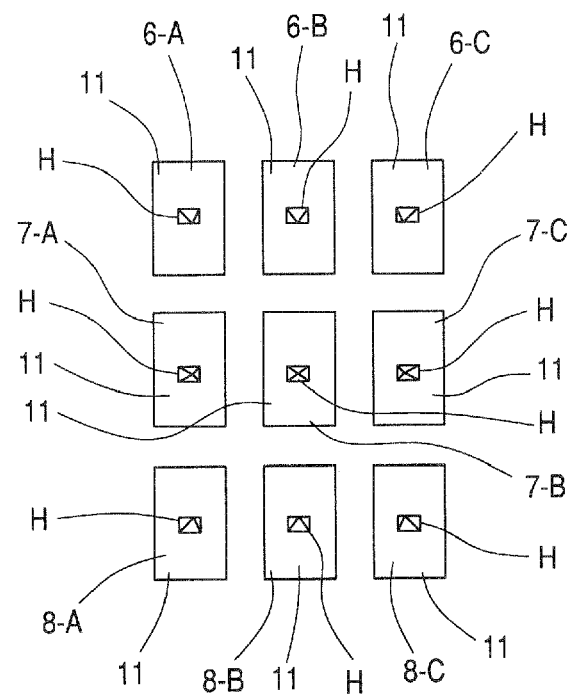
FIG. 5 illustrates an example of an aerial photograph data set according to the present invention.

The captured images selected in this manner from FIG. 2 are arranged as shown in FIG. 5. FIG. 5 shows an example of an aerial photograph data set according to the present invention. The selected images 11 of the selected 6-A, 6-B, 6-C, 7-A, 7-B, 7-C, 8-A, 8-B, and 8-C images are arranged so that rows form rows, columns form columns, and the rows and columns are perpendicular. They are arranged in order according to their imaging positions, and the target point H is at the center of the frame of each image.

In the selected images 11 in FIG. 5, a hypothetical pyramid is shown at the target point. Because of the different imaging positions, the same target point H is represented with different shapes. In row 6, the apex of the triangle lies on the lower side of a small rectangle at different positions. In row 7, the apex is positioned at the middle of the small rectangle, with small variations in the position. In row 8, the apex lies on the upper side of the small rectangle. The position of the apex of the triangle shifts when going from row A to row B to row C. Thus, it is possible to access different states of the target point, making it very useful in surveying, plotting, observation, and the like. This also has the advantage of allowing any target point to be selected and also allows images to be obtained from different angles of any target point.

Figure 6:
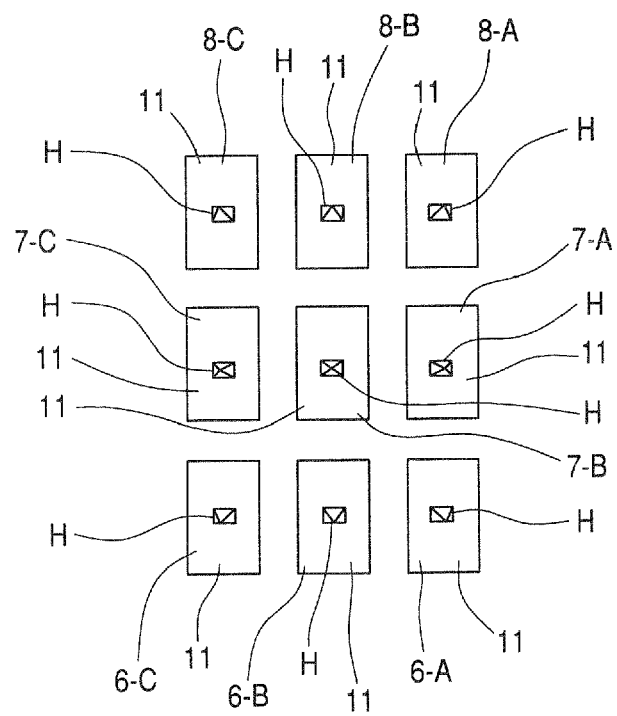
FIG. 6 illustrates an example of moving the aerial photograph data set in FIG. 5 point-symmetrically.

In FIG. 5, the data set shows the pyramid leaning toward the center. This is generally not preferable since it makes for visual discomfort in the user. Thus, it would be preferable to move the selected images 11 in point symmetry to the center and use or display the images as shown in FIG. 6. In FIG. 6, the selected images 11 from FIG. 5 are moved in point symmetry around the selected image from the imaging position 7-B. The selected image 11 from the imaging position 8-C that was at the lower right in FIG. 5 is positioned at the upper left in FIG. 6. The other images are likewise moved from the positions shown in FIG. 5 in point symmetry around the center. As in FIG. 5, the target point H is projected onto the selected images via back projection.

With FIG. 6, the pyramids appear to be leaning outward, which is preferable for use or displaying because of the resulting lack of visual discomfort and ease of viewing. Thus, for the aerial photograph data set according to the present invention, it would be preferable to take the aerial photograph data set obtained according to the method of the present invention and to move it in point symmetry around the selected image positioned at the center. This also falls within the scope of the aerial photograph data set according to the present invention.

Figure 7:
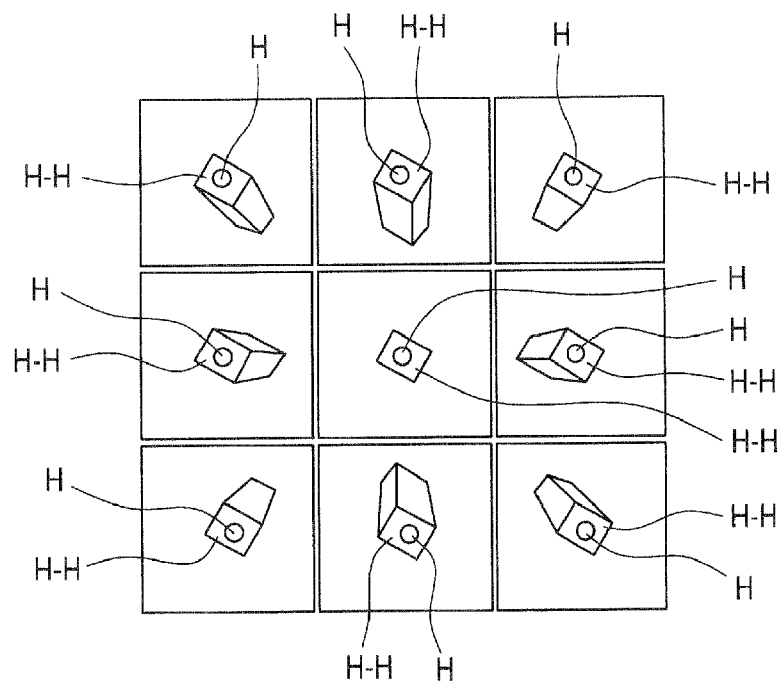
FIG. 7 illustrates an example of an aerial photograph data set and an example display thereof according to the present invention.
Figure 8:
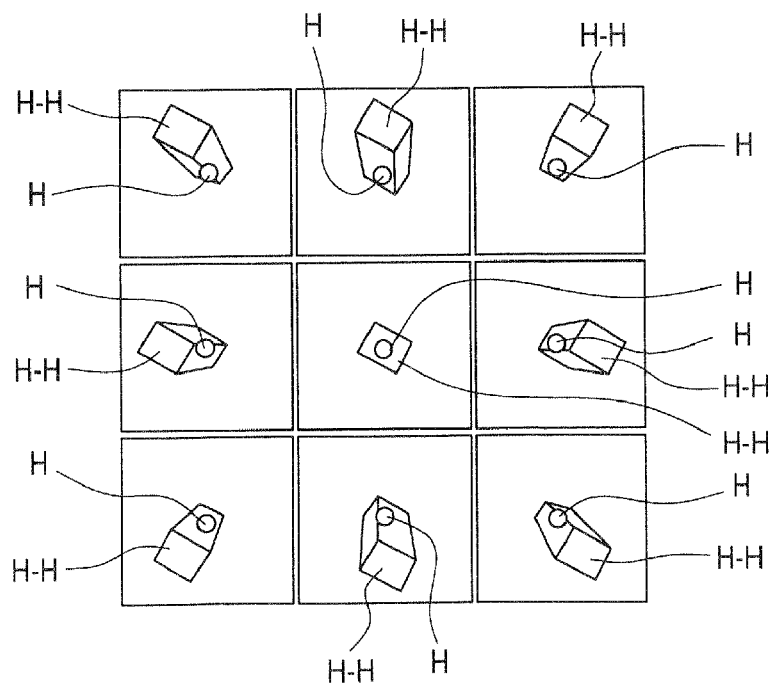
FIG. 8 illustrates another example of an aerial photograph data set and an example display thereof according to the present invention.

A rooftop (target point H) of a building (H-H) in actual images obtained by imaging from above the Shibuya district with an endlap ratio and sidelap ratio of approximately 0.8 was used as a target point, and the operations from FIG. 1 through FIG. 6 were carried out. The building (H-H) is displayed schematically, and the data set corresponding to the one in FIG. 6 is shown in FIG. 7. Nine captured images with the target point H at the center were obtained. FIG. 6 shows an example of M=N=3 (L=3). In FIG. 8, the target point H is for the same building in FIG. 7 with the height set at near ground level. Otherwise, the images were prepared as in FIG. 7. By setting the height of the target point, different selected images can be obtained. In FIG. 8, the target point is positioned at the center of the lower layer of the building H-H and is shown at the center of the nine images. The actual target point H cannot be seen from the outside, so the target point H shown In the images other than the image positioned at the center indicates the height position.

Figure 9:
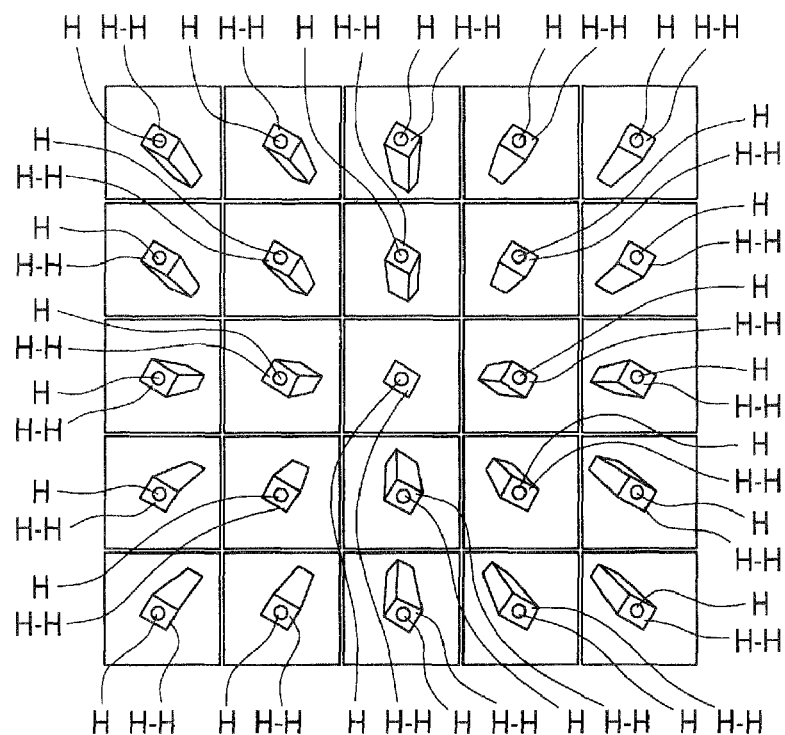
FIG. 9 illustrates yet another example of an aerial photography image data set and an example display thereof according to the present invention.

FIG. 9 was prepared in the same manner as FIG. 7 except that M=N=5 (L=5). Thus, the target point H is set up at the rooftop of the building H-H. The differences between the angles of the building are more pronounced, allowing a more detailed observation of the side surfaces and the like.

As FIG. 7, FIG. 8, and FIG. 9 show, a target point can be seen from different directions and different angles. For example, if the target point is a building, the state of the side surfaces can be observed carefully since it appears to slop in different directions. This has applications in surveying, real estate assessment, site surveying, and the like, expanding the potential applications and uses, providing a meaningful aerial photography image data set. By choosing the display of the data set, various advantages can be expected.

Figure 10:
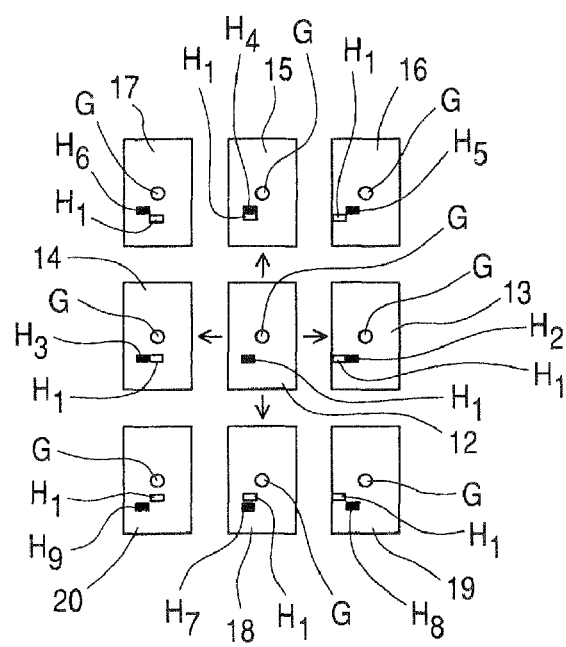
FIG. 10 illustrates another example of the present invention showing an example of how a target point is moved.

In the present invention, a method for moving the target point and creating a plurality of associated aerial photography image data sets, and an example of an aerial photography image data set obtained therefrom and a display method will be described as a single example based on FIG. 1 through FIG. 6. First, for the creation of the initial aerial photography image data set and the aerial photography image data set, the method shown in FIG. 1 through FIG. 6 and the resulting data set are used. FIG. 10 illustrates the moving or the shift described above, and the captured image 12-20 corresponds to the captured image 9 in FIG. 1 through FIG. 6. FIG. 10 shows captured image centers G and the target point H in the captured image 12 is indicated as H1. In the image 13, a target point H2 is the result of moving (shifting) the target point H1 (Displayed here on the captured images via back projection. The same goes for the other target points referred to below.) by a defined distance in the forward direction of the imaging direction from FIG. 1. The target point H1 from before the shift is indicated in the image 13 by dotted lines. Also, in the image 14, the target point H3 is the result of shifting by the same distance the target point H1 in the direction opposite from the imaging direction. For these movements, the distance between imaging positions is selected. Theoretically the movement (shift) distance of the target points is the distance between imaging positions, but in practice an average value is used. In the following description, the movement distances of the target points are all the same.

The captured image 18 shows the initial target point H1 with dotted lines and a new target point H7 resulting from shifting the target point H1 by the same distance in the forward direction in the direction crossing the imaging direction (cross direction). The captured image 15 shows the initial target point H1 with dotted lines and a new target point H4 resulting from shifting the target point by the same distance in the reverse direction in the cross direction. In the case of FIG. 10, the cross direction is perpendicular to the imaging direction.

With the captured image 12 at the center, new target points are set up on the right of FIG. 10 by shifting in the imaging direction in the forward direction and on the left side by shifting in the imaging direction in the reverse direction. On the lower side of FIG. 10, the target point is shifted in the cross direction in the forward direction and on the upper side the target point is shifted in the cross direction in the reverse direction.

Thus, for example, in the captured image 20, the target point H7 from the captured image 18 is shifted by the same distance to the left (i.e., in the imaging direction in the reverse direction) to form the new target point H9. For the target point H9, this is the same as shifting the target point H3 by the same distance downward (in the cross direction in the forward direction). The original target point H1 is indicated with dotted lines.

The figure shows the new target points H1 through H9, the corresponding captured images 12 through 20, and the imaging center G. The original target point H1 before shifting is indicated with dotted lines. For the target points H2 through H9, the method of FIG. 1 through FIG. 6 is repeated as in the target point 1 to prepare aerial photography image data sets corresponding to the target points.

Figure 11:
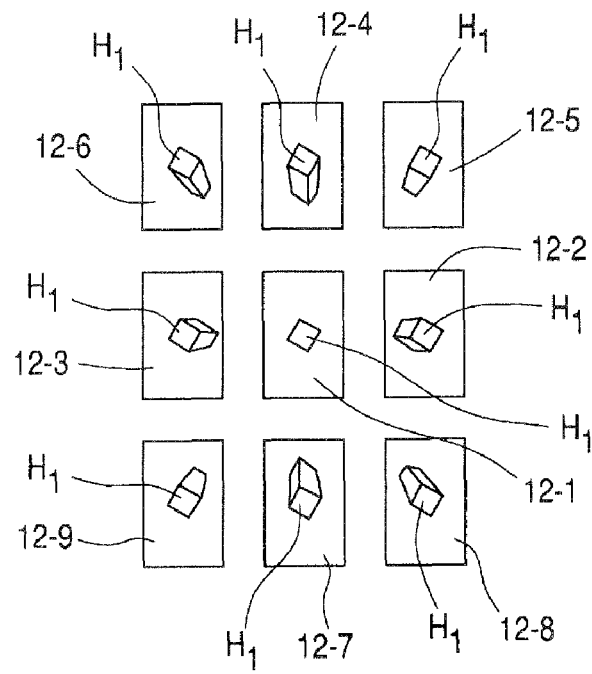
FIG. 11 illustrates an aerial photograph data set based on a single target point from FIG. 7.
Figure 12:
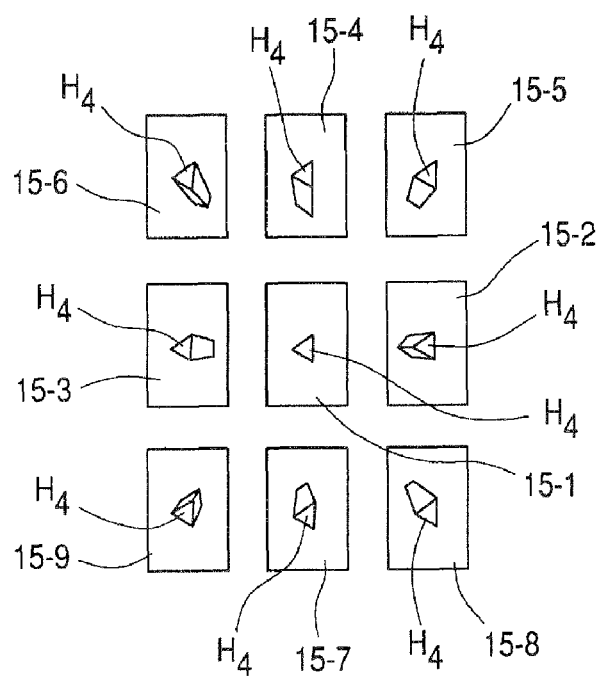
FIG. 12 illustrates an aerial photography image data set based on another target point from FIG. 7.

FIG. 11 shows an aerial photography image data set corresponding to FIG. 6 obtained for the target point H1 of the captured image 12. The set contains data for 9 photographs from the selected image 12-1 through 12-9. Similarly, FIG. 12 shows the aerial photography image data set prepared using the method of FIG. 1 through 6 for the target point H4 in the captured image 15. FIG. 12 shows an aerial photograph data set formed from the data of the 9 aerial photographs, the selected image 15-1 through 15-9.

Similarly, for each target point, a corresponding aerial photography image data set is created. Thus, an aerial photography image data set formed from 9 selected images is created for each of the 9 target points. Thus, the target point can be shifted (moved) and multiple corresponding aerial photograph data sets can be prepared.

Figure 13:
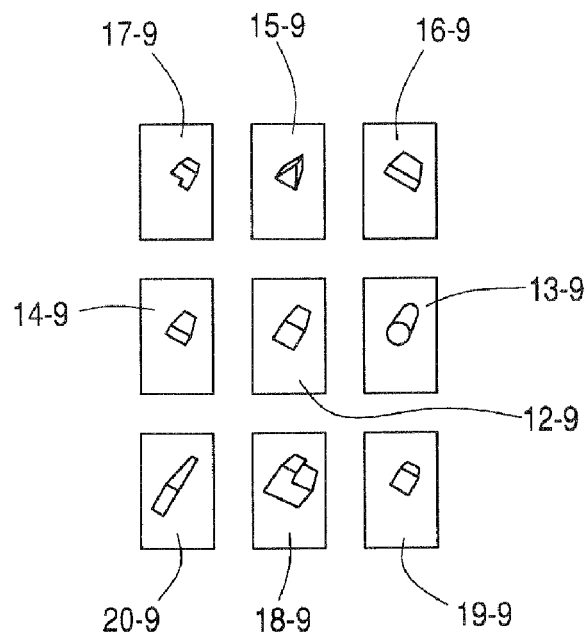

FIG. 13 shows an aerial photograph data set created by selecting, from the multiple aerial photograph data sets prepared by shifting the target point, images from the same rows and columns and arranging them in positions corresponding to the shifting. The selected image 15-9 is from row 3, column 1 of the aerial photograph data set of FIG. 12. The selected image 12-9 is from row 3, column 1 of the aerial photograph data set of FIG. 11. In this manner, the selected images at row 3, column 1 are selected from the aerial photograph data sets associated with the target points H1 through H9 in FIG. 10, each of which include 9 selected images. These Images 12-9, 13-9, 14-9, 15-9, 16-9, 17-9, 18-9, 19-9, and 20-9 are then arranged to correspond with the captured images.

With the aerial photograph data set of FIG. 13 obtained in this manner, images leaning in the same direction can be seen arranged consecutively. If the ranges of the selected images are overlapped slightly, it would be possible to create a continuous image seen from a single angle and that appears continuous. With the conventional method, the images from directly below the imaging position were prepared consecutively, resulting in rows of rooftops of buildings. With the present invention, it is possible to observe a particular side surface state from the overall stereoscopic image. This is useful not only for surveying but also for images used in real estate assessment, allowing a real estate purchaser to correctly appreciate the state of the real estate. Another advantage is that observations can be made from the viewpoint of the user's interests.

Using FIG. 10, the movement and the amount of displacement of the target point were described in terms of the distance between imaging positions. However, taken from another perspective, similar results can be obtained by making the relative spatial position relationship (the three-dimensional positional relationship) between the target point and the center point of the captured image equal for all of the captured images 12 through 20 and creating a new target point.

Also, the aerial photograph data sets for the target points H1 through H9 of the selected images 12-1-20-9 were obtained using the method of FIG. 1 through FIG. 6. However, it would also be possible to perform the steps of FIG. 1 through FIG. 5, with the step for creating the final FIG. 6 omitted. However, when creating FIG. 13, it is important to note the selection positions (rows and columns) of the selected images, and it is important to note in FIG. 5 and FIG. 6 that the images are point-symmetrical to the center.

Furthermore, in the example in FIG. 13, row 3, column 1 was selected from the aerial photograph data sets, but choosing another row and column would make it possible to create consecutive images with the images tilting in a different direction, thus providing consecutive aerial photographs as seen from a different direction. This provides the advantage of allowing different types of surveys, evaluations, studies, observations, and the like to be made to an object.

Figure 14:
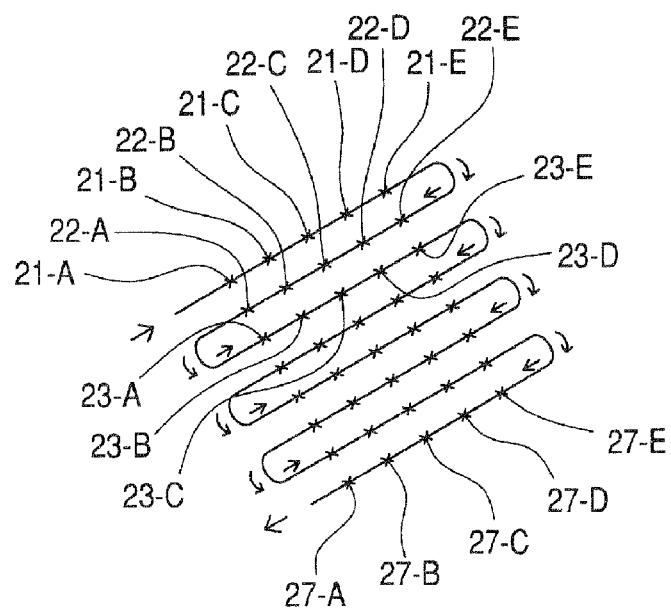
FIG. 14 illustrates an example of a diagonal aerial photography flight path and imaging sites.

FIG. 14 shows an example with a flight path for aerial photography imaging that was conducted in the past or in which for some reasons it was not possible to fly east-west or north-south. Assuming the top of the figure is north, in this example the flight took place from the southeast to the northeast, turned around, and then went from northeast to southeast, with this pattern being repeated. The figure shows the imaging sites 21-A, 21-B, and the like, and the intermediate numerals are omitted.

Figure 15:
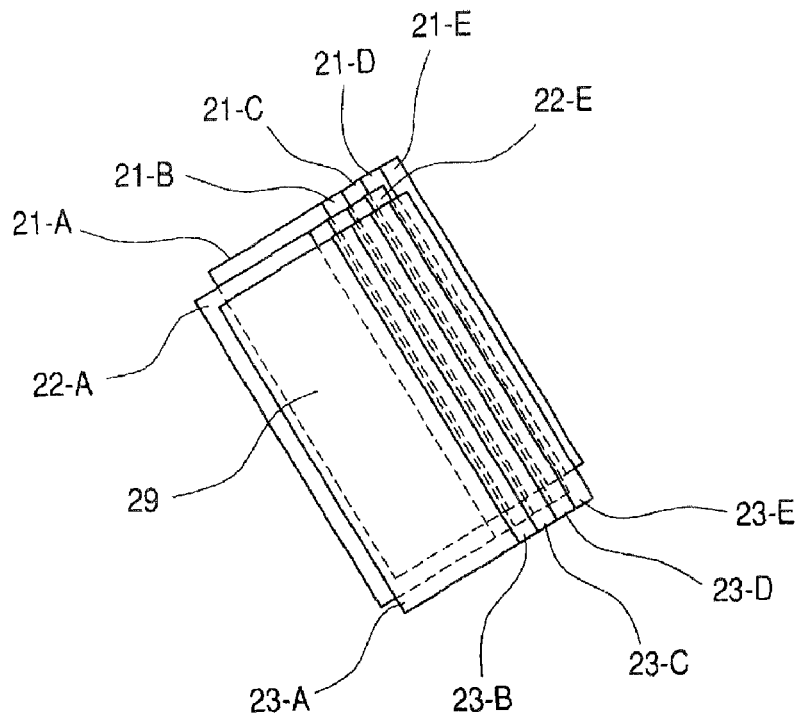
FIG. 15 illustrates a drawing corresponding to FIG. 2 showing images captured from FIG. 14.

In FIG. 15, the captured images 29 obtained from the imaging site 21-A to the imaging site 23-E from the flight shown in FIG. 14 are overlapped. This figure corresponds to FIG. 2. In this example, there are shifts between rows and shifts between columns.

Figure 16:
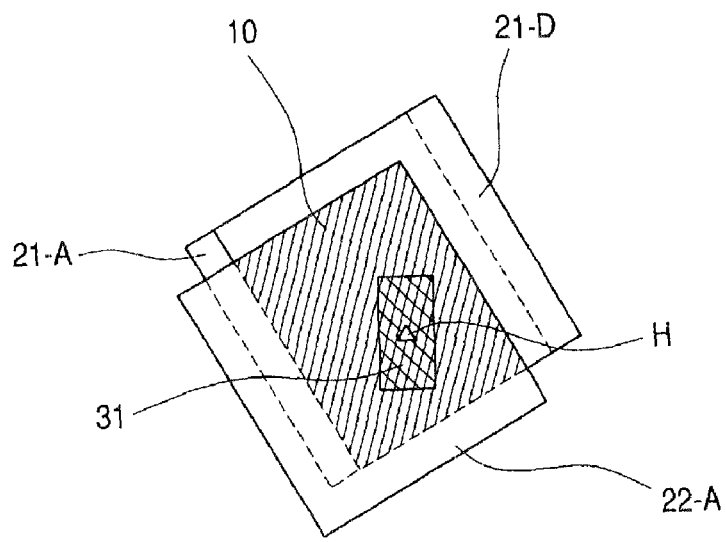
FIG. 16 illustrates a drawing corresponding to FIG. 4 showing images captured from FIG. 15.

FIG. 16 corresponds to FIG. 4. In this example, the captured images for the imaging sites 21-A, 21-B, and 22-A are selected. To correct to east-west, north-south captured images, in this example, a selected image 31 indicated by the dark shading in the shaded overlap image section 10 is set up aligned to the north-south axis as shown. As in FIG. 4, there is shown the target point H. As in the above case, the target point H is displayed on the captured images via back projection.

Aerial photograph data sets according to the present invention are prepared from the selected image 31 in FIG. 16 according to the method illustrated in FIG. 1 through FIG. 6. This makes it possible to use aerial photographs from the past and also makes it possible to create aerial photograph data sets where north, south, east, and west are easy to see even if for some reason a standard flight path could not be taken. The method illustrated in FIG. 10 through FIG. 13 can then be applied to the aerial photograph data sets obtained in this manner to create a consecutive aerial photograph data set. The obtained aerial photography image data set can be displayed as a matrix as shown in FIG. 6 and FIG. 13, or it can be arranged in a staggered pattern or the like.

Figure 17:
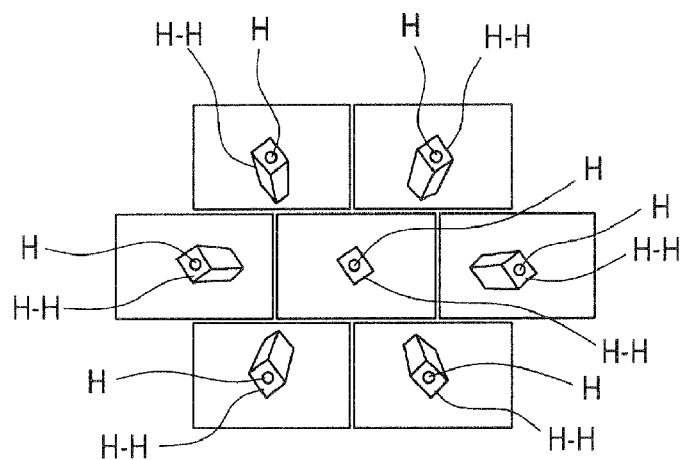
FIG. 17 illustrates an example of a staggered matrix.

FIG. 17 is an example of an aerial photograph data set arranged in a staggered pattern or a display thereof. Images were captured above the Shibuya district with an endlap ratio and sidelap ratio both set to approximately 67%, with a flight plan in which the odd-numbered rows (e.g., row 21, 23) are as shown in the flight plan in FIG. 14. The even-numbered rows (e.g., row 22) have staggered imaging positions slightly shifted to the northeast compared to FIG. 14 (e.g., imaging positions of 22-A and the like are slightly shifted to the north east). Out of these captured images, one captured image and the captured image to the east, the west, the northeast, the northwest, the southeast, and the southwest were selected. An aerial photography image data set was created using the same method as was used for FIG. 7. FIG. 17 shows a building H-H selected as the target point, with the target point H being the rooftop.

The present invention as described above is useful for surveying, plotting, observations, and the like, and the appearance of a target point can be seen from different angles. Parts that were not visible due to shadows can be seen, thus allowing detailed observation. Also, displays can be saved as aerial photography image data sets and can also be varied according to the desires of the observer.

Figure 18:
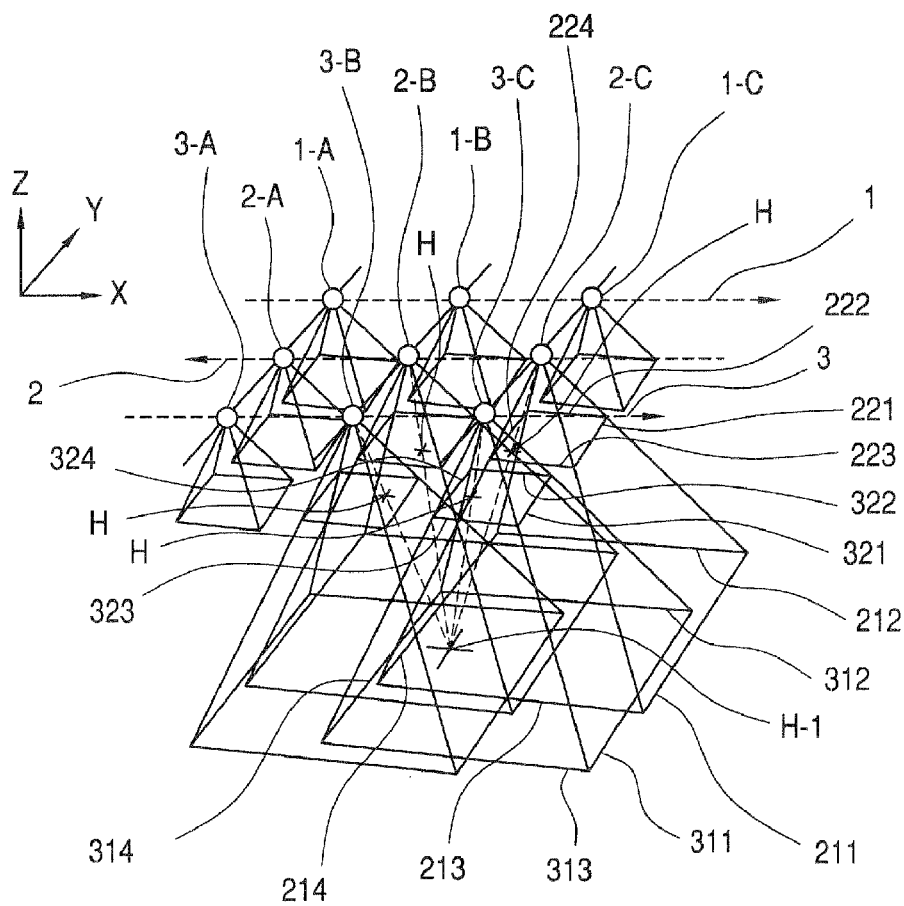
FIG. 18 illustrates the purpose of providing a supplemental description of FIG. 1 through FIG. 6 and an explanation of back projection.

FIG. 18 is a simplified diagram for the purpose of illustrating back projection and for providing a supplemental description of FIG. 1 through FIG. 6 from another perspective. In this example, for an imaging direction 1, 2, and 3, imaging was performed at imaging positions 1-A, 1-B, 1-C, 2-A, 2-B, 2-C, 3-A, 3-B, and 3-C. For example, the imaging ranges surrounded by frames 211, 212, 213, and 214, are imaged as captured images of the regions surrounded by the frames 211, 212, 213, and 214.

Also, for example, the imaging ranges surrounded by frames 311, 312, 313, and 314 along the X axis and the Y axis are imaged as captured images of the regions surrounded by the frames 321, 322, 323, and 324. The target point H-1 is contained in these imaging ranges and is displayed on the captured images as the target point H. The height of the imaging range is the result of taking all of what was imaged and cutting a horizontal plane (reference plane) at the height of the target point H-1 (Z direction).

The target point H is formed where the line extending between the target point H-1 in the imaged object and the imaging point intersects with the captured image (this is referred to as back projection). As a result, the image position of the target point H differs for each image, but these are aligned and overlapped in FIG. 2 through FIG. 4.

In the actual imaging, there are changes in the imaging position and the rotation angles around the Z axis, the Y axis, and the X axis. Corrections are made for these and the images are corrected and the captured images are created so that the positional relationship between the imaging position and the imaging object are as shown in FIG. 17 (correction of target position on image coordinates through back projection with orientation parameters). When doing this, the imaging position is generally corrected so that it is at the center. Alternatively, it would be possible to prepare the captured images by correcting the imaging object.

What is claimed is:

1. A method for creating an aerial photograph data set comprising:

a step of selecting, in an air flight direction for aerial photography and/or in the cross direction crossing the flight direction out of a plurality of captured images obtained in the aerial photography, M×N captured images where M and N are positive integers of no more than $1/(1-A)$ and $1/(1-B)$ respectively, which captured images include a target point in an overlap section, wherein A is an endlap ratio in the flight direction, wherein A=1 indicates complete overlap, and $0 \leq A<1$, while B being a sidelap ratio in the cross direction, wherein B=1 indicates complete overlap, and $0 \leq B<1$;

a step of producing selected images by selecting an image section in a specific range in each of the selected captured image which range includes the target point in the overlap section; and a step of creating, along the flight direction serving as a first axis and the cross direction serving as a second axis, an data set as a matrix with M columns along the first axis and N rows along the second axis, in imaging sequence along the first axis and in imaging sequence along the second axis respectively.

2. A method for creating an aerial photograph data set according to claim 1, wherein the image sections are obtained so that the spatial position of the target point is put at the center of the image section through back projection with correction for orientation parameters.

3. A method for creating an aerial photograph data set according to claim 1, wherein, using a virtual spatial position in which the spatial position is positioned at a predetermined distance for a new target point from the target point, the method further comprising steps of repeating the method for creating the aerial photography image data set for the new target point, repeating the positioning the new target point for other new target point(s) in the flight direction and in the cross direction, for creating a plurality of aerial photography image data sets.

4. A method for creating an aerial photograph data set according to claim 1, further comprising:

a step of shifting the target point for a new target point with a predetermined distance wherein the aerial photography image data set is used as a first set;

a step of creating a new aerial photograph data set for the new target point in the same way for the first set;

a step of repeating the steps of shifting and creating in both the forward direction and the reverse direction of the flight direction and in both the forward direction and the reverse direction of the cross direction to provide new target points and new aerial photograph data sets for P times on one side of the flight direction and Q times on one side of the cross direction where P and Q are positive integers, for creating the $((2P+1)\times(2Q+1)-1)$ new target points and new aerial photograph data set;

a step of selecting one specific image is selected from each of the $(2P+1)\times(2Q+1)$, including the first set, aerial photography image data sets; and a step of positioning the specific image from the first set at the center while the specific images selected from the P and Q shifted aerial photography image data sets is positioned corresponding to their respective shifts.

5. A method for creating an aerial photography image data set according to claim 4, wherein the specific images are selected from the same row and same column from the aerial photography image data sets.

6. A method for creating an aerial photograph data set according to claim 4, wherein P=Q=1.

7. A method for creating an aerial photograph data set according to claim 1, comprising further:

a step of inputting the spatial position of the target point.

8. A method for creating an aerial photograph data set according to claim 1, wherein L×L, where L is an integer that is no more than the smaller of M and N, of the selected images adjacent to each other are selected from the image set while a specific image set is created by arranging the selected images in an L×L matrix in the arrangement of the image set.

9. A method for creating an aerial photography image data set according to claim 1, wherein A=B and M=N.

10. A method for creating an aerial photograph data set according to claim 9, wherein A=B=0.8 or approximately 0.8, while M=N=5.

11. A method for creating an aerial photograph data set according to claim 1, wherein the selected image is rectangular.

12. A method for creating an aerial photograph data set according to claim 11, wherein the aspect ratio of the rectangle is 2:1 or roughly 2:1.

13. A non-transitory computer-readable storage medium having thereon a computer software program for creating an aerial photograph data set by the steps comprising:

a step of selecting, in an air flight direction for aerial photography and/or in the cross direction crossing the flight direction out of a plurality of captured images obtained in the aerial photography, M×N captured images where M and N are positive integers of no more than $1/(1-A)$ and $1/(1-B)$ respectively, which captured images include a target point in an overlap section, wherein A is an endlap ratio in the flight direction, wherein A=1 indicates complete overlap, and $0 \leq A<1$, while B being a sidelap ratio in the cross direction, wherein B=1 indicates complete overlap, and $0 \leq B<1$;

a step of producing selected images by selecting an image section in a specific range in each of the selected captured image which range includes the target point in the overlap section; and a step of creating, along the flight direction serving as a first axis and the cross direction serving as a second axis, an data set as a matrix with M columns along the first axis and N rows along the second axis, in imaging sequence along the first axis and in imaging sequence along the second axis respectively.

14. The computer readable medium according to claim 13, wherein the image sections are obtained so that the spatial position of the target point is put at the center of the image section through back projection with correction for orientation parameters.

15. The computer readable medium according to claim 13, wherein using a virtual spatial position in which the spatial position is positioned at a predetermined distance for a new target point from the target point, the method further comprising steps of repeating the method for creating the aerial photography image data set for the new target point, repeating the positioning the new target point for other new target point(s) in the flight direction and in the cross direction, for creating a plurality of aerial photography image data sets.

16. The computer readable medium according to claim 13, wherein the steps of the program further comprising:

a step of shifting the target point for a new target point with a predetermined distance wherein the aerial photography image data set is used as a first set;

a step of creating a new aerial photograph data set for the new target point in the same way for the first set;

a step of repeating the steps of shifting and creating in both the forward direction and the reverse direction of the flight direction and in both the forward direction and the reverse direction of the cross direction to provide new target points and new aerial photograph data sets for P times on one side of the flight direction and Q times on one side of the cross direction, where P and Q are positive integers, for creating the $((2P+1)\times(2Q+1)-1)$ new target points and new aerial photograph data set;

a step of selecting one specific image is selected from each of the $(2P+1)\times(2Q+1)$, including the first set, aerial photography image data sets; and a step of positioning the specific image from the first set at the center while the specific images selected from the P and Q shifted aerial photography image data sets is positioned corresponding to their respective shifts.

17. The computer readable medium according to claim 16, wherein the specific images are selected from the same row and same column from the aerial photography image data sets.

18. The computer readable medium according to claim 16, wherein P=Q=1.

19. The computer readable medium according to claim 13, wherein L×L, where L is an integer that is no more than the smaller of M and N, of the selected images adjacent to each other are selected from the image set while a specific image set is created by arranging the selected images in an L×L matrix in the arrangement of the image set.

20. The computer readable medium according to claim 13, wherein A=B and M=N.

21. The computer readable medium according to claim 20, wherein A=B=0.8 or =0.8, and M=N=5.

22. The computer readable medium according to claim 13, wherein the selected image is rectangular.

23. The computer readable medium according to claim 22, wherein the aspect ratio of the rectangle is 2:1 or roughly 2:1.

24. A method for displaying an aerial photograph data set comprising:

a step of displaying, in the matrix form, a desired number of vertical and horizontal images selected from the aerial photograph data set produced by:

a step of selecting, in an air flight direction for aerial photography and/or in the cross direction crossing the flight direction out of a plurality of captured images obtained in the aerial photography, M×N captured images, where M and N are positive integers of no more than $1/(1-A)$ and $1/(1-B)$ respectively, which captured images include a target point in an overlap section, wherein A is an endlap ratio in the flight direction, wherein A=1 indicates complete overlap, and $0 \leq A < 1$, while B being a sidelap ratio in the cross direction, wherein B=1 indicates complete overlap, and $0 \leq B < 1$;

a step of producing selected images by selecting an image section in a specific range in each of the selected captured image which range includes the target point in the overlap section; and a step of creating, along the flight direction serving as a first axis and the cross direction serving as a second axis, an data set as a matrix with M columns along the first axis and N rows along the second axis, in imaging sequence along the first axis and in imaging sequence along the second axis respectively.

25. A method for displaying an aerial photograph data set according to claim 24, wherein the image sections are obtained so that the spatial position of the target point is put at the center of the image section through back projection with correction for orientation parameters.

26. A method for displaying an aerial photography image data set according to claim 24, wherein the steps of the method further comprises:

a step of shifting the target point for a new target point with a predetermined distance wherein the aerial photography image data set is used as a first set;

a step of creating a new aerial photograph data set for the new target point in the same way for the first set;

a step of repeating the steps of shifting and creating in both the forward direction and the reverse direction of the flight direction and in both the forward direction and the reverse direction of the cross direction to provide new target points and new aerial photograph data sets for P times on one side of the flight direction and Q times on one side of the cross direction, where P and Q are positive integers, for creating the $((2P+1)\times(2Q+1)-1)$ new target points and new aerial photograph data set; and a step of selecting one specific image is selected from each of the $(2P+1)\times(2Q+1)$, including the first set aerial photography image data sets; and a step of positioning the specific image from the first set at the center while the specific images selected from the P and Q shifted areal photography image data sets is positioned corresponding to their respective shifts.

27. A method for displaying an aerial photography image data set according to claim 26, wherein the specific images are selected from the same row and same column from the aerial photography image data sets.

28. A method for displaying an aerial photography image data set according to claim 26, wherein P=Q=1.

29. A method for displaying an aerial photography image data set according to claim 24, wherein L×L, where L is an integer that is no more than the smaller of M and N, of the selected images adjacent to each other are selected from the image set while a specific image set is created by arranging the selected images in an L×L matrix in the arrangement of the image set.

30. A method for displaying an aerial photography image data set according to claim 24, wherein A=B while M=N.

31. A method for displaying an aerial photography image data set according to claim 30, wherein A=B=0.8 or approximately 0.8, while M=N=5.

32. A method for displaying an aerial photography image data set according to claim 24, wherein the selected image is rectangular.

33. A method for displaying an aerial photography image data set according to claim 32, wherein the aspect ratio of the rectangle is 2:1 or roughly 2:1.

* * * * *